S. T. Varian,
Post Protector.
No. 87,015. Patented Feb. 16, 1869.
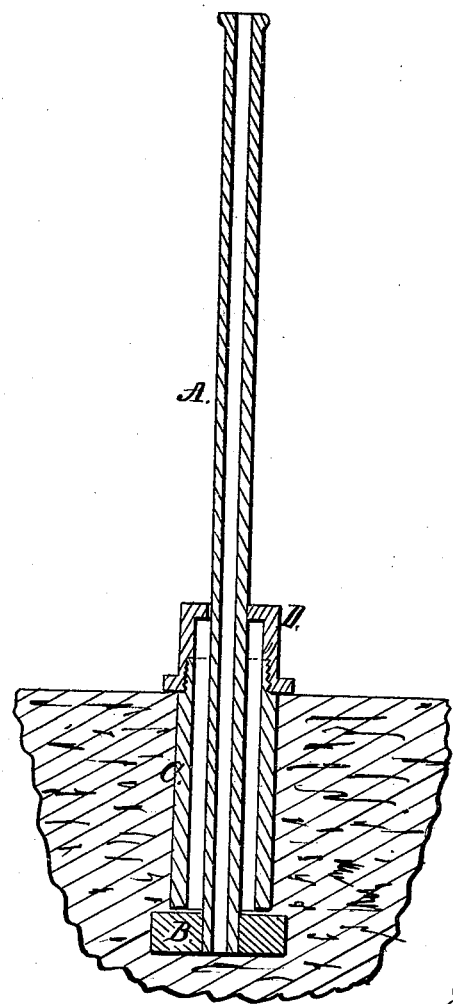
Witnesses:
Gustave Dietrich
Wm. Wingau
Inventor:
S. T. Varian
pr Munn & Co.
Attys.

SAMUEL T. VARIAN, OF PLAINFIELD, NEW JERSEY.

Letters Patent No. 87,015, dated February 16, 1869.

IMPROVEMENT IN FROST-PROTECTOR FOR POSTS.

The Schedule referred to in these Letters Patent and making part of the same.

*To all whom it may concern:*

Be it known that I, SAMUEL T. VARIAN, of Plainfield, Union county, New Jersey, have invented a new and improved Frost-Protector for Posts, &c.; and I do hereby declare that the following is a full, clear, and exact description thereof, which will enable others skilled in the art to make and use the same, reference being had to the accompanying drawing, forming part of this specification.

The present invention relates to a new and useful device for the protection and prevention of the effects of frost on the supports of piazzas and buildings, gate or fence-posts, the effect of the frost being received on a sliding tube or cylinder fitted over the main support, the construction and operation of which will be understood from the following description.

The drawing represents a sectional elevation of a supporting-column of a piazza with my post-protector attached.

The letter A represents a metal column, set on a pedestal, B, at such a depth below the surface of the ground as not to be affected by the frost.

Then an outer case or cylinder, C, is slipped over the said column loosely, the same being capped with a suitable stuffing-box, D, so as to prevent water from running into the cylinder and freezing it to the column.

It will thus be seen that the action of the frost against the cylinder C will have no effect on the column supporting the piazza, for as the frost heaves up the ground around the supports, it will simply cause the cylinder C to slide up the supporting-columns and leave them unmoved.

Having thus described my invention,

I claim as new, and desire to secure by Letters Patent—

The outer case or cylinder C, as applied to the supports of piazzas and buildings, gate or fence-posts, in the manner and for the purpose substantially as herein shown and described.

SAMUEL T. VARIAN.

Witnesses:
  FRANK BLOCKLEY,
  ALEX. F. ROBERTS.